United States Patent
Cen et al.

(10) Patent No.: US 12,079,975 B1
(45) Date of Patent: Sep. 3, 2024

(54) METHOD, SYSTEM, AND READABLE STORAGE MEDIUM FOR MONITORING WELDING CAMERA

(71) Applicant: ShenZhen Rayshine Automation Technology Co., LTD., Guangdong (CN)

(72) Inventors: Quan Cen, Guangdong (CN); Zengwen Zhang, Guangdong (CN); Xinjian Li, Guangdong (CN); Yongze Luo, Guangdong (CN)

(73) Assignee: ShenZhen Rayshine Automation Technology Co., LTD., Guangdong (CN)

( * ) Notice: Subject to any disclaimer, the term of this patent is extended or adjusted under 35 U.S.C. 154(b) by 0 days.

(21) Appl. No.: 18/398,410

(22) Filed: Dec. 28, 2023

(30) Foreign Application Priority Data

Sep. 19, 2023 (CN) .......................... 202311214718.6

(51) Int. Cl.
| | | |
|---|---|---|
| G06T 7/00 | (2017.01) | |
| G06T 7/33 | (2017.01) | |
| G06T 7/73 | (2017.01) | |

(52) U.S. Cl.
CPC .......... G06T 7/0002 (2013.01); G06T 7/337 (2017.01); G06T 7/74 (2017.01); G06T 2207/10016 (2013.01); G06T 2207/20081 (2013.01); G06T 2207/20084 (2013.01); G06T 2207/30108 (2013.01); G06T 2207/30168 (2013.01)

(58) Field of Classification Search
CPC ............... H04N 13/243; H04N 13/282; H04N 2213/001; H04N 23/45; H04N 23/51; H04N 23/54; H04N 23/55; H04N 23/57; H04N 23/64; H04N 5/04
See application file for complete search history.

(56) References Cited

U.S. PATENT DOCUMENTS

| | | | | |
|---|---|---|---|---|
| 2009/0231423 A1* | 9/2009 | Becker | ................... | H04N 7/183 386/326 |
| 2023/0117584 A1* | 4/2023 | Huh | ................... | G02B 27/0172 345/8 |
| 2024/0048826 A1* | 2/2024 | Chou | ................... | H04N 23/52 |

* cited by examiner

*Primary Examiner* — Masum Billah
(74) *Attorney, Agent, or Firm* — Cooper Legal Group, LLC

(57) ABSTRACT

A method, system, and readable storage medium for monitoring welding camera, the method comprises: determining that a device to be welded is in a welding process, and acquiring a set of images of the device to be welded; obtaining a sharpness change rate according to the set of images by utilizing an image resolution algorithm; and inputting the sharpness change rate into a sharpness stress mapping model to obtain a stress change of the device to be welded.

7 Claims, 5 Drawing Sheets

---

Acquiring a set of images of a device to be welded when it is determined that the device to be welded is in a welding process — S101

Obtaining a sharpness change rate of the set of images by utilizing an image resolution algorithm — S102

Inputting the sharpness change rate into a sharpness stress mapping model to obtain a stress change of the device to be welded — S103

When determining that a device to be welded is in a welding process, acquiring a set of images of the device to be welded, the set of images includes: a first image of a plane to be detected containing the device to be welded before welding; a second image containing the plane to be detected after welding the device to be welded; when welding the device to be welded, a plurality of third images of the plane to be detected captured sequentially at a preset time interval ⸺ S301

Obtaining a sharpness change rate of the first image, the second image and the plurality of third images by utilizing the image resolution algorithm ⸺ S302

Inputting the sharpness change rate into a sharpness stress mapping model to obtain the stress changes of the device to be welded ⸺ S303

FIG. 3

S401: When determining that a device to be welded is in a welding process, acquiring a set of images of the device to be welded, the set of images includes: a first image of a plane to be detected containing the device to be welded before welding; a second image containing the plane to be detected after welding the device to be welded; a plurality of third images of the plane to be detected captured sequentially at a preset time interval when welding the device to be welded; a fourth image of surrounding area of the welding device corresponding to a shooting time of the first image; a fifth image of surrounding area of the welding device corresponding to the shooting time of the second image; a plurality of sixth images of surrounding area of the welding device one by one corresponding to the shooting times of the plurality of third images S402: Determining a first sharpness change rate of the plane to be detected according to the first image, the second image, and the plurality of third images S403: Determining a second sharpness change rate of surrounding area of the welding device according to the fourth image, the fifth image, and the plurality of sixth images S404: Determining a sharpness change rate according to the first and second sharpness change rates S405: Inputting the sharpness change rate into a sharpness stress mapping model to obtain stress changes of the device to be welded

FIG. 4

```
┌─────────────────────────────────────────────────────────────┐
│ When determining that a device to be welded is in a welding │
│ process, acquiring a set of images of the device to be      │
│ welded, the set of images includes: a first image of a      │
│ plane to be detected containing the device to be welded     │
│ before welding; a second image containing the plane to be   │
│ detected after welding the device to be welded; when        │
│ welding the device to be welded, a plurality of third       │
│ images captured by shooting the plane to be detected        │
│ sequentially at a preset time interval; a first predicted   │
│ image corresponding to a shooting time of the first image,  │ ─ S501
│ the first predicted image is obtained by mapping all        │
│ images of surrounding area of the welding device            │
│ corresponding to the shooting time of the first image; a    │
│ second predicted image corresponding to a shooting time     │
│ of the second image, the second predicted image is          │
│ obtained by mapping all images of surrounding area of the   │
│ welding device corresponding to the shooting time of the    │
│ second image; a plurality of third predicted images one by  │
│ one corresponding to shooting time of the plurality of      │
│ third images, the plurality of third predicted images are   │
│ obtained by mapping all images of surrounding area of the   │
│ welding device one by one corresponding to the shooting     │
│ time of the plurality of third images                       │
└─────────────────────────────────────────────────────────────┘
                              ↓
┌─────────────────────────────────────────────────────────────┐
│ Determining a first sharpness change rate of the plane to   │
│ be detected according to the first image, the second image, │ ─ S502
│ and the plurality of third images                           │
└─────────────────────────────────────────────────────────────┘
                              ↓
┌─────────────────────────────────────────────────────────────┐
│ Determining a third sharpness change rate of the plane to   │
│ be detected according to the first predicted image, the     │ ─ S503
│ second predicted image, and the plurality of predicted      │
│ images                                                      │
└─────────────────────────────────────────────────────────────┘
                              ↓
┌─────────────────────────────────────────────────────────────┐
│ Determining a sharpness change rate according to the first  │ ─ S504
│ and third sharpness change rates                            │
└─────────────────────────────────────────────────────────────┘
                              ↓
┌─────────────────────────────────────────────────────────────┐
│ Inputting the sharpness change rate into a sharpness stress │ ─ S505
│ mapping model to obtain stress changes of the device to be  │
│ welded                                                      │
└─────────────────────────────────────────────────────────────┘
```

FIG. 5

METHOD, SYSTEM, AND READABLE STORAGE MEDIUM FOR MONITORING WELDING CAMERA

CROSS-REFERENCE TO RELATED APPLICATION

This application claims the priority and benefit of Chinese patent application No. 202311214718.6, filed on Sep. 19, 2023. The entirety of Chinese patent application No. 202311214718.6 is hereby incorporated by reference herein and made a part of this specification.

TECHNICAL FIELD

The present application relates to a technical field of image recognition technology, and in particular, relates to a method, system, and readable storage medium for monitoring a welding camera.

BACKGROUND ART

With a deepening development of automotive electronic and intelligence, an in-car camera, as an important sensor, has greatly affected a performance and safety of automobiles. In a process of producing these cameras, a common method includes welding a plurality of points at a same time point based on a symmetry principle (although welding a plurality of points at the same time point is not a simultaneity in a strict sense, but a relative simultaneity. That is to say, these welding points will complete the welding in a very short time range, for example, between 0.1, 0.3, and 0.5 seconds). The method can significantly improve production efficiency, but it also leads to a problem, which is a change in material stress during a welding process.

At present, in order to monitor stress changes during the welding process, computer simulation methods in related technologies require calculating a simulation of the welding process to predict the stress changes during the welding process. However, computer simulation methods in related technologies require a large amount of computing resources, and accuracy is limited by a complexity and accuracy of a simulation model.

SUMMARY

The present application provides a method, system, and readable storage medium for monitoring a welding camera. The method does not require a large amount of computing resources and is not limited by a complexity and accuracy of simulation models. Instead, it can accurately and efficiently predict stress changes during a welding process.

In a first aspect, the present application provides a method for monitoring a welding camera, the method comprises: determining that a device to be welded is in a welding process, and acquiring a set of images of the device to be welded; obtaining a sharpness change rate according to the set of images utilizing an image resolution algorithm; and inputting the sharpness change rate into a sharpness stress mapping model to obtain a stress change of the device to be welded.

In a second aspect, the present application provides a system for monitoring a welding camera, including a server, the server comprises:
an acquisition module, configured to determine that a device to be welded is in a welding process, and acquire a set of images of the device to be welded;
a sharpness module, configured to obtain a sharpness change rate according to the set of images by utilizing an image resolution algorithm; and
a stress module, configured to input the sharpness change rate into a sharpness stress mapping model to obtain a stress change of the device to be welded.

In a third aspect, the present application provides a system for monitoring a welding camera, including one or more processors and memory;
wherein the memory is coupled with one or more processors, and the memory is configured to store computer program code, wherein the computer program code includes computer instructions, and the one or more processors call the computer instructions to enable the monitoring system of the welding cameras to execute the method according to the first aspect.

In a fourth aspect, the present application provides a computer-readable storage medium, including instructions, wherein, when the above instructions are run on a monitoring system of a welding camera, the monitoring system of the welding camera executes the method according to the first aspect.

One or more technical solutions provided in the embodiments of the present application have at least the following technical effects or advantages:
the present application provides the monitoring method for the welding cameras. By obtaining the set of images of the device to be welded, utilizing the image resolution algorithm to obtain the sharpness change rate, and inputting the sharpness change rate into the sharpness stress mapping model to obtain the stress changes of the device to be welded, the stress changes during a welding process can be observed and monitored in real time and intuitively. Compared with computer simulation methods of existing technology, the present method does not require a large amount of computational resources and is not limited by a complexity and accuracy of simulation models, it can accurately and efficiently predict stress changes during the welding process, thereby improving welding quality and optimizing production efficiency.

BRIEF DESCRIPTION OF THE DRAWINGS

FIG. 3 is a flowchart of a method for monitoring a welding camera according to the present application.

FIG. 4 is a flowchart of a method for monitoring a welding camera according to the present application.

FIG. 5 is a flowchart of a method for monitoring a welding camera according to the present application.

DETAILED DESCRIPTION

A method for monitoring a welding camera according to an embodiment is described below.

Figure 1:
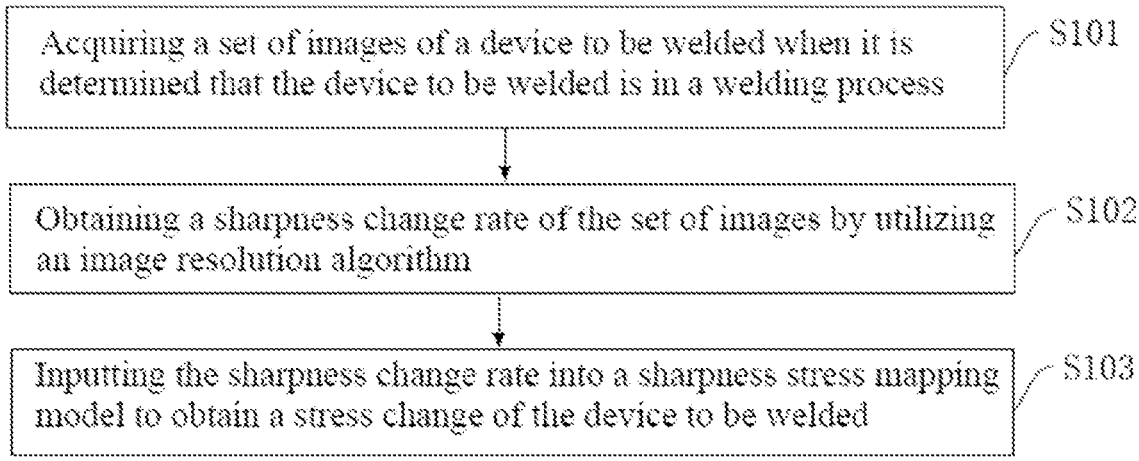
FIG. 1 is a flowchart of a method for monitoring a welding camera according to the present application.

Referring to FIG. 1, FIG. 1 is a flowchart of a method for monitoring a welding camera according to the present application.

S101: acquiring a set of images of a device to be welded when it is determined that the device to be welded is in a welding process.

It is needed to determine whether the device to be welded is already in the welding process. During the welding process, a specific stress change will be generated in the device to be welded, resulting in a slight deformation of the device.

The set of images can be acquired with a camera. When acquiring the set of images, it should be ensured that the images are sufficiently sharp; and, preferably, the images are focused on a plane of the device to be welded. The reason lies that, the plane of the device to be welded is extremely sensitive to the stress changes, and the image sharpness will directly affect an accuracy of subsequent image resolution algorithm.

A plurality of welding points on the device to be welded may be welded substantially simultaneously rather than strictly simultaneously. In other words, these welding points may be welded within a very short period of time, for example, 0.1, 0.3, and 0.5 seconds.

S102: obtaining a sharpness change rate of the set of images by utilizing an image resolution algorithm.

In the embodiment of the present application, the image resolution algorithm is a Spatial Frequency Response (SFR), including steps of: 0. obtaining a ROI of a vertical bevel edge; 1. normalizing data; 2. calculating a pixel centroid of each row in the image; 3. using a least square method to perform linear fitting on a centroid of each row to obtain a straight line about the centroid; 4. repositioning the ROI to obtain an ESF; 5. performing a quadruple oversampling on an obtained ESF; 6. obtaining a LSF through a differential operation; 7. applying a hamming window to LSF; and 8. performing a DFT operation. A specific use and principle of the image resolution algorithm are relatively established, and thus not limited here.

In the above embodiment, the focus of the camera is adjusted according to a distance, shape, and size of an object. If the object undergoes deformation, it may change the distance between the object and the camera or the shape and size of the object, which may result in inaccurate camera focus and affect a sharpness of the image. The shape and a surface texture of the object will affect scattering and reflection of light. If the object undergoes deformation, it may change patterns of the scattering and reflection of light, which may lead to changes in the sharpness of the image.

S103: inputting the sharpness change rate into a sharpness stress mapping model to obtain a stress change of the device to be welded.

A preset sharpness stress mapping model is trained with the sharpness change rate as input data and the stress changes as output data. The sharpness stress mapping model can be any known model, such as deep neural networks, convolutional neural networks or recurrent neural networks, preferably, a mathematical model, and more specifically, a mathematical model based on mapping relationships.

It can be seen that by obtaining the set of images of the device to be welded, utilizing the image resolution algorithm to obtain the sharpness change rate, and inputting the sharpness change rate into the sharpness stress mapping model to obtain the stress changes of the device to be welded, the stress changes during a welding process in real time and intuitively can be observed and monitored. Compared with computer simulation methods of existing technology, the method does not require a large amount of computational resources and is not limited by a complexity and accuracy of simulation models. It can accurately and efficiently predict stress changes during the welding process, thereby improving welding quality and optimizing production efficiency.

Figure 2:
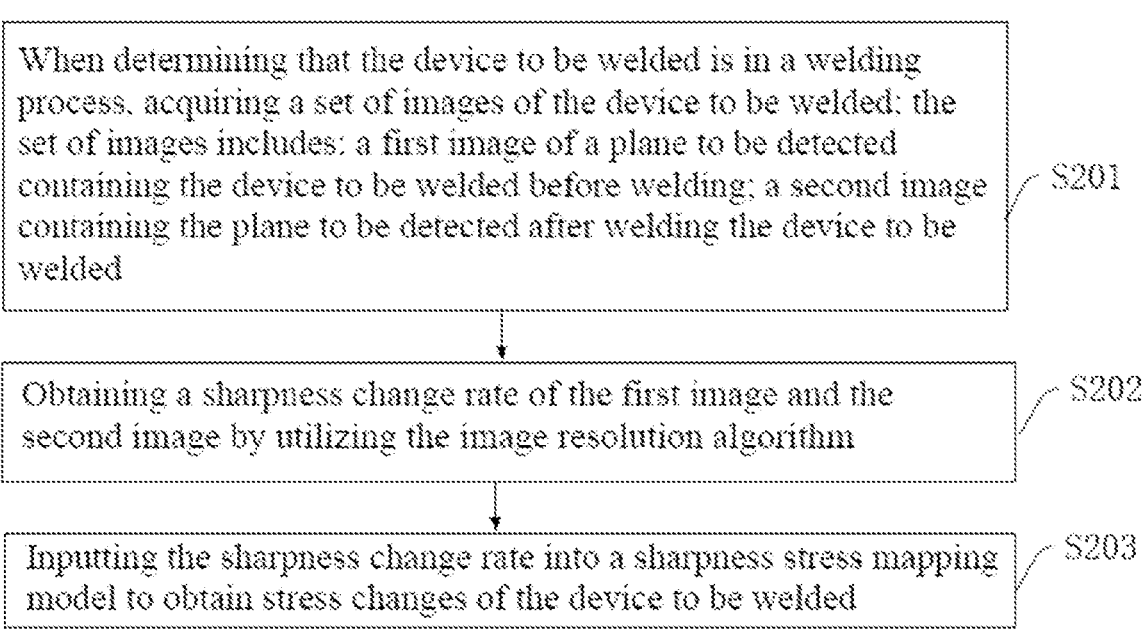
FIG. 2 is a flowchart of a method for monitoring a welding camera according to the present application.

Taking four specific methods as examples, combined with the embodiments shown in FIGS. 2 to 5, more specific description of the present application embodiments will be provided bellow:

In a first embodiment, reference is made to FIG. 2, which shows a flowchart of the method for monitoring welding cameras according to the present application.

S201: when determining that the device to be welded is in a welding process, acquiring a set of images of the device to be welded; wherein the set of images includes: a first image of a plane to be detected containing the device to be welded before welding; a second image containing the plane to be detected after welding the device to be welded.

It should be noted that during a welding process, a large amount of sparks will be generated, which will emit a strong light. A change in light intensity may affect a sharpness of the image. For example, when a light of sparks illuminates on the plane to be detected, it may cause overexposure to the image, causing certain parts of the image to become too bright, thereby reducing the sharpness of the image.

Therefore, it can be conceived that the first image and the second image are images before and after welding, respectively, therefore, the first image and the second image will not contain noise generated by sparks.

S202: obtaining a sharpness change rate of the first image and the second image by utilizing the image resolution algorithm.

A step adopted in the embodiment belongs to a same concept as the step in the above embodiment, a specific implementation process is described in details in step S102, and thus is not repeated here.

S203: inputting the sharpness change rate into a sharpness stress mapping model to obtain stress changes of the device to be welded.

The step adopted in the embodiment belongs to the same concept as the step in the above embodiment, the specific implementation process is described in details in step S103, and thus is not repeated here.

It can be seen that by comparing the images before and after welding, the stress changes of the welding to the device to be welded can be intuitively observed and analyzed, at the same time, only the images before and after welding are obtained, effectively avoiding impacts of changes in irradiation intensity caused by sparks during the welding process on image sharpness.

The above embodiment may cause a new problem in practical use, that is, the images before and after welding can indeed help understand a general situation of the stress changes, but it is impossible to determine at which process of the welding process these stress changes occur, since there is no images acquired during the welding process. For example, it may not be possible to determine which process has a greatest stress change. Therefore, some important opportunities to improve the welding process may be missed. Therefore, taking a solution to the above problem as an example, combined with the embodiment shown in FIG. 3, a more specific description of the present application embodiment is provided below.

In a second embodiment, FIG. 3 is a flowchart of the method for monitoring a welding camera according to the present application.

S301: when determining that a device to be welded is in a welding process, acquiring a set of images of the device to be welded, wherein the set of images includes: a first image of a plane to be detected containing the device to be welded before welding; a second image containing the plane to be detected after welding the device to be welded; when welding the device to be welded, a plurality of third images of the plane to be detected captured sequentially at a preset time interval.

A step adopted in the embodiment belongs to a same concept as the step in the above embodiment, a specific implementation process is described in details in step S201, and it is not repeated here.

S302: obtaining a sharpness change rate of the first image, the second image and the plurality of third images by utilizing the image resolution algorithm.

A first sharpness is obtained by inputting the first image before welding into the image resolution algorithm. The first sharpness can be regarded as an initial state of a welding process and used as a reference for calculating a subsequent sharpness change rates. A second sharpness is obtained by inputting the second image after welding into the same image resolution algorithm. By comparing the first sharpness with the second sharpness, a total sharpness change rate can be obtained, which reflects an impact of the welding process on a device state. Further, the plurality of third images captured sequentially at a preset time interval during the welding process are inputted into the image resolution algorithm. The sharpness is calculated for each of the plurality of third image and, a sharpness of a former image is compared with a sharpness of a later image to obtain the sharpness change rate during this period.

Therefore, not only the sharpness change rate before and after welding, but also the sharpness change rate for each preset time period during the welding process can be obtained. These sharpness change rate data can provide detailed information on the stress changes during the welding process, helping to better understand and control the welding process.

S303: inputting the sharpness change rate into a sharpness stress mapping model to obtain the stress changes of the device to be welded.

The step adopted in the embodiment belongs to the same concept as the step in the above embodiment, the specific implementation process is described in details in step S103, and it is not repeated here.

It can be seen that by shooting several third images of the plane to be detected sequentially at a preset time interval during the welding process, more information about the welding process can be obtained. The information can help understand at which process of the welding process the stress changes occur, thereby providing a possibility for in-depth understanding and optimizing the welding process.

The above embodiment provides the possibility for in-depth understanding and optimizing the welding process, but in practical use, a large amount of sparks will be generated during the welding process, which will emit a strong light. A change in light intensity may affect a sharpness of the image. For example, when a light of sparks shines on the plane to be detected, it may cause overexposure to the image, causing certain parts of the image to become too bright, thereby reducing the sharpness of the image. On the contrary, when the light of sparks disappears, the image may become too dark, thereby increasing a noise of the image and also reducing the sharpness of the image. Therefore, taking a solution to the above problem as an example, combined with the embodiment shown in FIG. 4, a more specific description of the present application embodiment is provided.

In a third embodiment, FIG. 4 is a flowchart of the method for monitoring a welding camera according to the present application.

S401: when determining that a device to be welded is in a welding process, acquiring a set of images of the device to be welded, wherein the set of images includes: a first image of a plane to be detected containing the device to be welded before welding; a second image containing the plane to be detected after welding the device to be welded; a plurality of third images of the plane to be detected captured sequentially at a preset time interval when welding the device to be welded; a fourth image of surrounding area of the welding device corresponding to a shooting time of the first image; a fifth image of surrounding area of the welding device corresponding to the shooting time of the second image; and a plurality of sixth images of surrounding area of the welding device one by one corresponding to the shooting times of the plurality of third images.

The first image is used as a reference image for reference and comparison, and the fourth image will be used to record ambient light conditions at a beginning of the welding process.

The second and fifth images will be compared with the reference image to evaluate an impact of the welding process on the plane to be detected and ambient light conditions.

Similarly, by shooting the plane to be detected sequentially at a preset time interval, a plurality of third images and a plurality of sixth images of surrounding area of the welding device corresponding to a shooting time of the third images are acquired. These images will be used to monitor dynamic changes during the welding process.

S402: determining a first sharpness change rate of the plane to be detected according to the first image, the second image, and the plurality of third images.

A step adopted in the embodiment belongs to a same concept as the step in the above embodiment, a specific implementation process is detailed in step S302, and it is not repeated here.

S403: determining a second sharpness change rate of surrounding area of the welding device according to the fourth image, the fifth image, and the plurality of sixth images.

The step adopted in the embodiment belongs to the same concept as the step in the above embodiment, the specific implementation process is described in details in step S302, and thus is not repeated here.

S404: determining a sharpness change rate according to the first and second sharpness change rates.

The process involves comparing and synthesizing the first and second sharpness change rates in an attempt to eliminate impacts of light changes and more accurately reflect true changes in the plane to be detected. Specifically, it includes comparing the first and second sharpness change rates at first, and then adjusting the first sharpness change rate according to a comparison result to eliminate the impacts of light changes. Finally, an adjusted first sharpness change rate is used as a final sharpness change rate.

S405: inputting the sharpness change rate into a sharpness stress mapping model to obtain stress changes of the device to be welded.

The step adopted in the embodiment belongs to the same concept as the step in the above embodiment, the specific implementation process is described in details in step S103, and thus is not repeated here.

It can be seen that the set of images further includes images related to a surrounding environment of the welding device. In this way, environmental factors, including changes in sparks irradiation intensity, can be taken into account when calculating the sharpness change rate of images. By comparing the sharpness change rate between the plane to be detected and a surrounding area of the welding device, sharpness changes caused by stress changes can be more accurately analyzed, thereby eliminating an impact of changes in sparks irradiation intensity on image sharpness and improving an accuracy of stress change prediction during the welding process.

The above embodiment eliminates the impact of changes in sparks irradiation intensity on image sharpness, but in practical use, there may still be some errors due to a fact that the plane to be detected and the surrounding area of the welding device are not a same area. Therefore, taking a solution to the above problem as an example, combined with the embodiment shown in FIG. 5, a more specific description of the present application embodiment is provided.

In a fourth embodiment, FIG. 5 is a flowchart of the method for monitoring a welding camera according to the present application.

S501: when determining that a device to be welded is in a welding process, acquiring a set of images of the device to be welded, wherein the set of images includes: a first image of a plane to be detected containing the device to be welded before welding; a second image containing the plane to be detected after welding the device to be welded; when welding the device to be welded, a plurality of third images captured by shooting the plane to be detected sequentially at a preset time interval; a first predicted image corresponding to a shooting time of the first image, the first predicted image is obtained by mapping all images of surrounding area of the welding device corresponding to the shooting time of the first image; a second predicted image corresponding to a shooting time of the second image, the second predicted image is obtained by mapping all images of surrounding area of the welding device corresponding to the shooting time of the second image; a plurality of third predicted images one by one corresponding to shooting time of the plurality of third images, the plurality of third predicted images are obtained by mapping all images of surrounding area of the welding device one by one corresponding to the shooting time of the plurality of third images.

Specifically, obtaining the first predicted image by mapping all images of surrounding area of the welding device corresponding to the shooting time of the first image includes:

determining all pixel points of the first image as unfilled pixel points; selecting an unfilled pixel point in the first image; determining a texture block that is most similar to pixels surrounding the unfilled pixel point in all images of the welding device corresponding to the shooting time of the first image; assigning an average pixel value of the texture block to the unfilled pixel point; determining the unfilled pixel point as a filled pixel point; and jumping to the step of selecting an unfilled pixel point of the first image until all pixel points of the first image are determined to be filled pixel points.

It can be seen that before obtaining the set of images of the device to be welded, a prediction operation of the image is completed by filling the average pixel value of the texture block on the pixel points of the first image.

Similarly, the second predicted image and the third predicted image are obtained according to a same method.

In practical use, there may be regional differences between the first predicted image, second predicted image, and third predicted image and the first image, second image, and third image. Therefore, based on the above technical problem, the first predicted image is registered with the first image; the second predicted image is registered with the second image; and several third predicted images is registered with their corresponding third images one by one.

Image registration is a common computer vision task configured to align two or more images to correspond to each other in space.

A specific embodiment includes finding some corner points and edge parts in each image, and then calculating a geometric transformation to align one image with another. The geometric transformation may be an affine transformation, projective transformation, or other type of transformation.

It can be seen that by registering predicted images with actual images before determining a sharpness change rate of the plane to be detected, a consistency of spatial layout between the predicted images and the actual images can be ensured. A step of registration can calibrate possible regional differences between the predicted images and the actual images, further improving an accuracy of calculating the sharpness change rate. The method compensates for a problem of regional inconsistency between the predicted images and the actual images.

S502: determining a first sharpness change rate of the plane to be detected according to the first image, the second image, and the plurality of third images.

S503: determining a third sharpness change rate of the plane to be detected according to the first predicted image, the second predicted image, and the plurality of predicted images.

S504: determining a sharpness change rate according to the first and third sharpness change rates.

S505: inputting the sharpness change rate into a sharpness stress mapping model to obtain stress changes of the device to be welded.

It can be seen that the predicted images are mapped from all images around the welding device, which can simulate an environmental state at a same time point as the plane to be detected, without being influenced by the device itself. Through the method, the sharpness change rate of the images caused by environmental changes can be calculated more accurately. In this way, the sharpness change rate of an original image and the predicted image can be compared, so as to more accurately analyze the sharpness change rate of the image caused by the device to be detected itself.

The following is an embodiment of the device of the present application, which can be configured to execute the embodiment of the method in the present application. For details not disclosed in the embodiments of the device in the present application, please referring to the embodiment of the method in the present application.

Figure 6:
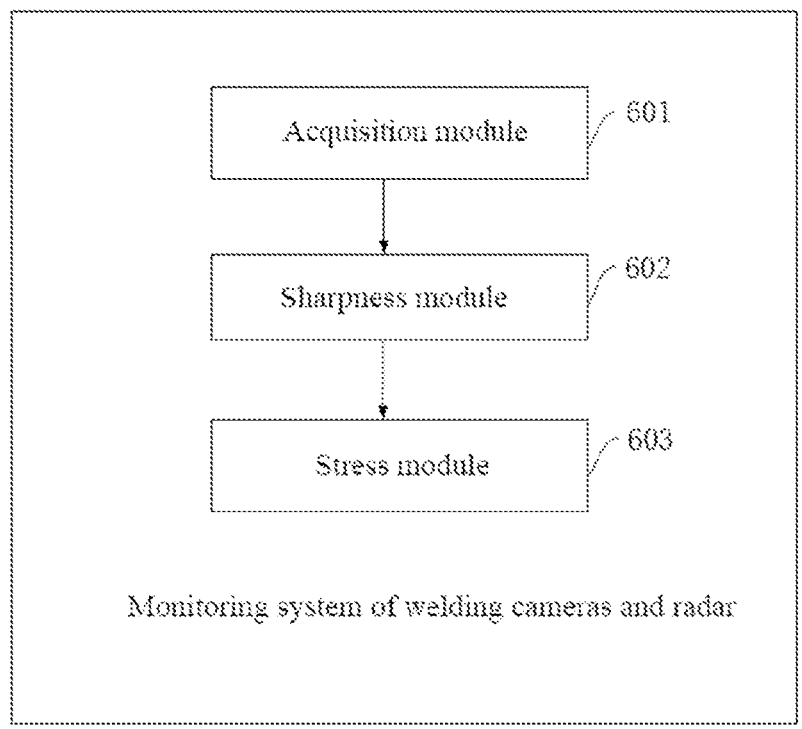
FIG. 6 is a schematic view of a modular virtual device of a system for monitoring a welding camera according to the present application.

Referring to FIG. 6, the embodiment of the present application provides a monitoring system for welding cameras, including a server,
  the server includes:
    an acquisition module 601, configured to obtain a set of images of a device to be welded when it is determined that the device to be welded is in a welding process;
    a sharpness module 602, configured to obtain a sharpness change rate according to the set of images utilizing an image resolution algorithm;

a stress module 603, configured to input the sharpness change rate into a sharpness stress mapping model to obtain a stress change of the device to be welded.

In some embodiments, the set of images specifically includes:
  before welding the device to be welded, a first image of a plane to be detected containing the device to be welded;
  after welding the device to be welded, a second image containing the plane to be detected.

In some embodiments, the set of images further includes:
  when welding the device to be welded, several third images are obtained by shooting the plane to be detected in an interval order of a preset time.

In some embodiments, the set of images further includes:
  a fourth image around a welding device corresponding to a shooting time of the first image;
  a fifth image around the welding device corresponding to the shooting time of the second image;
  several sixth images around the welding device corresponding to the shooting time of several third images one by one;
  the sharpness module specifically includes:
  a first sharpness submodule, configured to determine a first sharpness change rate of the plane to be detected according to the first image, several third images, and the second image;
  a second sharpness submodule, configured to determine a second sharpness change rate around the welding device according to the fourth image, several sixth images, and the fifth image;
  a third sharpness submodule, configured to determine the sharpness change rate according to the first and second sharpness change rates.

In some embodiments, the set of images further includes:
  a first predicted image corresponding to the shooting time of the first image is mapped from all images around the welding device corresponding to the shooting time of the first image;
  a second predicted image corresponding to the shooting time of the second image is mapped from all images around the welding device corresponding to the shooting time of the second image;
  several third predicted images corresponding to the shooting time of several third images are mapped from all images around the welding device corresponding to the shooting time of the third image;
  the sharpness module specifically includes:
  a fourth sharpness submodule is configured to determine the first sharpness change rate of the plane to be detected according to the first image, several third images, and the second image;
  a fifth sharpness submodule is configured to determine a third sharpness change rate of the plane to be detected according to the first predicted image, several third predicted images, and the second predicted image;
  a sixth sharpness submodule is configured to determine the sharpness change rate according to the first and third sharpness change rates.

In some embodiments, the server further includes:
  a first registration module, configured to register the first predicted image with the first image;
  a second registration module, configured to register the second predicted image with the second image;
  a third registration module, configured to register several third predicted images with their corresponding third images one by one.

In some embodiments, the server further includes:
  a first determination module is configured to determine all pixel points of the first image as unfilled pixel points;
  a selection module is configured to select an unfilled pixel point in the first image;
  a second determination module is configured to determine a texture block that is most similar to pixels surrounding the unfilled pixel point in all images around the welding device corresponding to the shooting time of the first image;
  an assignment module is configured to assign an average pixel value of the texture block to the unfilled pixel point;
  a third determination module is configured to determine the unfilled pixel point as a filled pixel point;
  a jump module is configured to jump a step of selecting an unfilled pixel point of the first image until all pixels of the first image are determined to be filled pixels.

Figure 7:
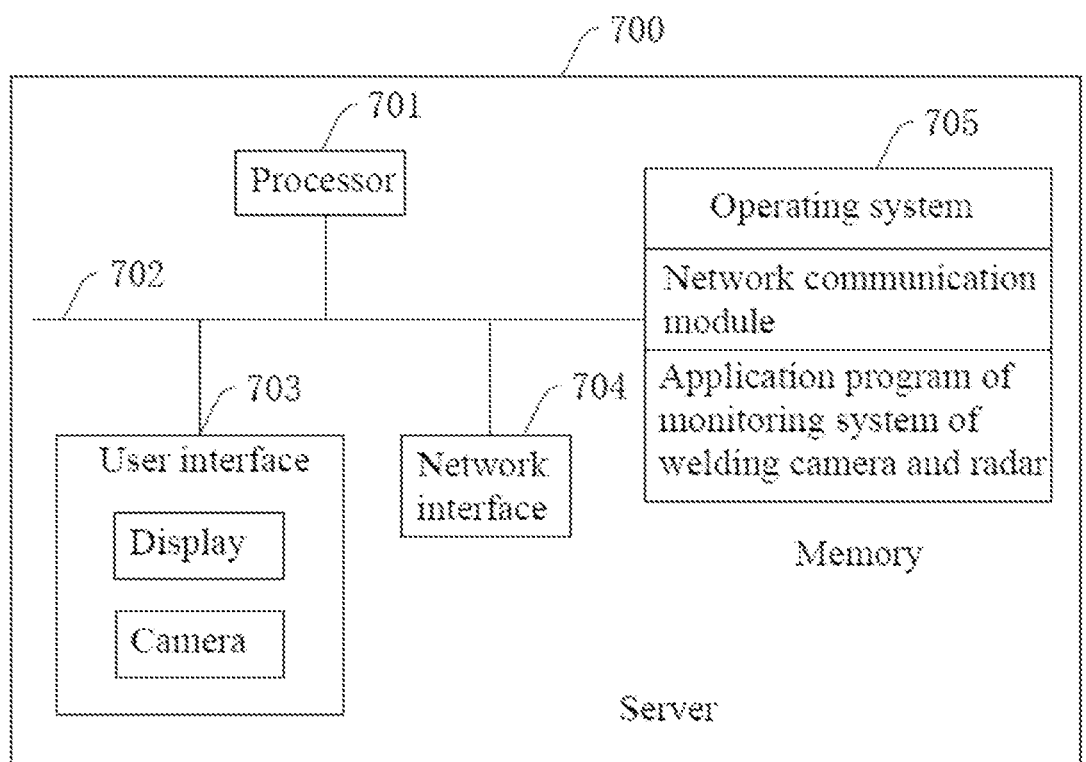
FIG. 7 is a schematic view of a physical device of a system for monitoring a welding camera according to the present application.

The present application also discloses a monitoring system for welding cameras. Referring to FIG. 7, a schematic view of a physical device of the monitoring system for the welding cameras provided in the present application. The server 700 can include: at least one processor 701, at least one network interface 704, user interface 703, memory 705, and at least one communication bus 702. The communication bus 702 is configured to achieve connections and communication between these components.

The user interface 703 can include a display screen and a camera, and an optional user interface 703 can further include standard wired interfaces and wireless interfaces.

The network interface 704 can include standard wired interfaces and wireless interfaces (such as WI-FI interfaces).

At least one processor 701 is configured to call computer instructions to cause the monitoring system of the welding camera to execute the monitoring method of the welding camera provided in the present application.

What is claimed is:

1. A method for monitoring a welding camera, comprising:
  determining that a device to be welded is in a welding process, and acquiring a set of images of the device to be welded;
  obtaining a sharpness change rate according to the set of images by utilizing an image resolution algorithm; and
  inputting the sharpness change rate into a sharpness stress mapping model to obtain a stress change of the device to be welded,
  wherein the set of images comprises:
    a first image of a plane to be detected containing the device to be welded before welding the device to be welded;
    a second image containing the plane to be detected after welding the device to be welded;
    a plurality of third images obtained by shooting the plane to be detected sequentially at a preset time interval when welding the device to be welded;
    a first predicted image corresponding to a shooting time of the first image, wherein the first predicted image is obtained by mapping all images of surrounding area of a welding device corresponding to the shooting time of the first image;
    a second predicted image corresponding to a shooting time of the second image, wherein the second predicted image is obtained by mapping all images of surrounding area of the welding device corresponding to the shooting time of the second image; and a plurality of third predicted images one by one corresponding to shooting times of the plurality of third images, wherein the plurality of third predicted images are obtained by mapping all images of surrounding area of the welding device corresponding to the shooting times of the plurality of third image; and obtaining the sharpness change rate according to the set of images by utilizing the image resolution algorithm comprises:

determining a first sharpness change rate of the plane to be detected according to the first image, the plurality of third images, and the second image;

determining a third sharpness change rate of the plane to be detected according to the first predicted image, the plurality of third predicted images, and the second predicted image; and determining the sharpness change rate according to the first sharpness change rate and the third sharpness change rate.

2. The method for monitoring a welding camera according to claim 1, wherein, before determining the third sharpness change rate of the plane to be detected according to the first predicted image, the plurality of third predicted images, and the second predicted image, the method further comprises:

registering the first predicted image with the first image;

registering the second predicted image with the second image; and registering the plurality of third predicted images with the plurality of third images.

3. The method for monitoring a welding camera according to claim 1, wherein, before determining that the device to be welded is in the welding process and acquiring the set of images of the device to be welded, the method further comprises:

determining all pixel points of the first image as unfilled pixel points;

selecting an unfilled pixel point of the unfilled pixel points in the first image;

determining, in all images of surrounding area of the welding device corresponding to the shooting time of the first image, a texture block that is most similar to pixels surrounding area the unfilled pixel point;

assigning an average pixel value of the texture block to the unfilled pixel point;

determining the unfilled pixel point as a filled pixel point; and jumping to the step of selecting an unfilled pixel point of the unfilled pixel points in the first image until all pixels of the first image are determined as filled pixels.

4. A system for monitoring a welding camera, comprising:
a server, wherein the server comprises:
an acquisition module, configured to determine that a device to be welded is in a welding process, and acquire a set of images of the device to be welded;
a sharpness module, configured to obtain a sharpness change rate according to the set of images by utilizing an image resolution algorithm; and
a stress module, configured to input the sharpness change rate into a sharpness stress mapping model to obtain a stress change of the device to be welded,
wherein the set of images comprises:
a first image of a plane to be detected containing the device to be welded before welding the device to be welded;
a second image containing the plane to be detected after welding the device to be welded;

a plurality of third images obtained by shooting the plane to be detected sequentially at a preset time interval when welding the device to be welded;
a first predicted image corresponding to a shooting time of the first image, wherein the first predicted image is obtained by mapping all images of surrounding area of a welding device corresponding to the shooting time of the first image;
a second predicted image corresponding to a shooting time of the second image, wherein the second predicted image is obtained by mapping all images of surrounding area of the welding device corresponding to the shooting time of the second image; and
a plurality of third predicted images one by one corresponding to shooting times of the plurality of third images, wherein the plurality of third predicted images are obtained by mapping all images of surrounding area of the welding device corresponding to the shooting times of the plurality of third image; and obtaining the sharpness change rate according to the set of images by utilizing the image resolution algorithm comprises:

determining a first sharpness change rate of the plane to be detected according to the first image, the plurality of third images, and the second image;

determining a third sharpness change rate of the plane to be detected according to the first predicted image, the plurality of third predicted images, and the second predicted image; and determining the sharpness change rate according to the first sharpness change rate and the third sharpness change rate.

5. A system for monitoring a welding camera, comprising:
one or more processors and memory;
wherein the memory is coupled with the one or more processors, and the memory is configured to store computer program code, wherein the computer program code comprises computer instructions, and the one or more processors are configured to call the computer instructions to enable the system for monitoring a welding camera to implement the method according to claim 1.

6. A non-transitory computer-readable storage medium with instructions stored thereon, wherein, the instructions are configured to run on a system for monitoring a welding camera, to enable the system for monitoring a welding camera to implement the method according to claim 1.

7. A method for monitoring a welding camera, comprising:
determining that a device to be welded is in a welding process, and acquiring a set of images of the device to be welded;
obtaining a sharpness change rate according to the set of images by utilizing an image resolution algorithm; and
inputting the sharpness change rate into a sharpness stress mapping model to obtain a stress change of the device to be welded,
wherein the set of images comprises:
a first image of a plane to be detected containing the device to be welded before welding the device to be welded;
a second image containing the plane to be detected after welding the device to be welded;
a plurality of third images obtained by shooting the plane to be detected sequentially at a preset time interval when welding the device to be welded;

a fourth image of surrounding area of a welding device corresponding to a shooting time of the first image;

a fifth image of surrounding area of the welding device corresponding to a shooting time of the second image; and a plurality of sixth images of surrounding area of the welding device one by one corresponding to shooting times of the plurality of third images; and obtaining the sharpness change rate according to the set of images by utilizing the image resolution algorithm comprises:

determining a first sharpness change rate of the plane to be detected according to the first image, the plurality of third images, and the second image;

determining a second sharpness change rate around the welding device according to the fourth image, the plurality of sixth images, and the fifth image; and determining the sharpness change rate according to the first sharpness change rate and the second sharpness change rate.

\* \* \* \* \*